US00H002099H

(19) United States

(12) Statutory Invention Registration

Heydlauff et al.

(10) Reg. No.: US H2099 H

(43) Published: Apr. 6, 2004

(54) DIGITAL VIDEO INJECTION SYSTEM (DVIS)

(75) Inventors: Bruce M. Heydlauff, Ridgecrest, CA (US); Thomas F. Reese, Bonita, CA (US)

(73) Assignee: The United States of America as represented by the Secretary of the Navy, Washington, DC (US)

(21) Appl. No.: 09/349,357

(22) Filed: Jul. 6, 1999

(51) Int. Cl.[7] ..... H04N 7/18

(52) U.S. Cl. ..... 382/100

(58) Field of Search ..... 382/100, 103; 342/76, 95, 96, 97, 357.07; 348/169; 356/29; 33/20.2

(56) References Cited

U.S. PATENT DOCUMENTS 4,267,562 A * 5/1981 Raimondi ..... 348/144
4,463,380 A * 7/1984 Hooks, Jr. ..... 348/580
4,855,822 A * 8/1989 Narendra et al. ..... 348/114
5,309,522 A * 5/1994 Dye ..... 382/154
5,546,943 A * 8/1996 Gould ..... 600/425
5,649,706 A * 7/1997 Treat, Jr. et al. ..... 273/358
5,719,797 A * 2/1998 Sevachko ..... 703/4
5,914,661 A * 6/1999 Gross ..... 340/600
6,011,581 A * 1/2000 Swift et al. ..... 348/58
6,100,897 A * 8/2000 Mayer et al. ..... 345/428
6,157,385 A * 12/2000 Oxaal ..... 345/427

* cited by examiner

*Primary Examiner*—Daniel T. Pihulic

(74) *Attorney, Agent, or Firm*—Earl H. Baugher, Jr.; Laura R. Foster

(57) ABSTRACT

A digital video injection system having a digital image source, means for image processing, a scan converter, a seeker-dynamics interface capable of controlling the image system and a digital system controller that is used to simulate real-time flight to an imaging system, such as an imaging weapons system. A method for injecting digital video and a digital video input product also are disclosed.

21 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DIGITAL VIDEO INJECTION SYSTEM (DVIS)

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention pertains generally to digital video injection systems and methods, and more particularly to a real time flight simulation system that allows matching of a complex scene image to weapons system optics to generate a realistic detailed response.

2. Brief Description of the Related Art

Many new weapons systems are currently being developed which employ advanced high resolution imaging systems. These imaging systems often operate at frequencies outside the visible light spectrum to enhance their ability to detect targets at night or during adverse weather conditions. Costs to develop these systems are rapidly increasing as advanced signal processing algorithms are employed to increase the probability of target detection and target recognition, with the ultimate goal of accurate target tracking and precise aim point selection for maximum probability of kill and minimum collateral damage. Live missile firings and captive-flight tests are expensive, often restricted to a limited number of available test sites. Unpredictable environmental conditions diminish the effectiveness of the testing to anticipate problems during actual combat operations.

Various weapon systems have been developed which employ advanced high resolution electro-optical / infrared (EO/IR) raster-scan image-based seeker systems. These image-based weapon systems typically utilize advanced signal processing algorithms to increase the probability of target detection and target recognition. Validation of such signal processing algorithms has traditionally been carried out through free flight, captive carry and static field tests of the image-based weapon systems, followed by lab analysis, modification of the algorithms, and then subsequent field tests followed by further analysis and modifications. This process is generally costly and time-intensive. Obtaining the correct target and weather conditions can add additional cost and time delay to this test/modify/re-test cycle. Further the process is incapable of working in a simulated "virtual" environment.

By accurately generating a digital image, rendered for the correct frequency spectrum, and fed to the imaging signal processing electronics, algorithms may be more easily developed and tested at a significantly lower cost. Images may be geometrically altered depending on the desired look angle and range to the target. Atmospheric conditions may be altered to test their effects.

Prior technology used to develop imaging weapons systems which do not fully resolve the problems addressed by the present invention include free flight test, captive carry flight test, static test, and CARCO Table dynamic simulation. Free flight, captive carry, and static testing all have the advantage of testing the actual weapons system, but often times are not repeatable, lack all the desired test parameters required at one time, and may be very expensive. CARCO Table dynamic testing is probably the best developmental testing tool, but creating a dynamic real time, accurate image in the correct frequency band, which the seeker may actually see is cost prohibitive, and in most cases beyond the state of the art currently available.

Accordingly, there is a need for a real time detailed video injection system and method that generates correct, complex, real-time output for testing. The present invention addresses these needs.

SUMMARY OF THE INVENTION

The Digital Video Injection System, abbreviated as DVIS, of the present invention comprises a real time, weapons virtual reality system that facilitates the design, development, test, validation, and simulation of imaging systems, such as imaging weapons systems.

The present invention includes a digital video injection system comprising a digital image source constituted from a reference image, means for image processing capable of converting an input from the digital image source into a geometrically correct frequency rendered digital image, a scan converter capable of accepting the digital image, wherein the scan converter is capable of storing and converting the digital image for compatibility with a imaging system, a seeker-dynamics interface capable of simulating the pointing system of the imaging system, and, a digital system controller capable of solving motion import in real time to the imaging system. In preferred embodiments, the imaging system of the present invention also is part of the digital video injection system, and the imaging system comprises an imaging weapons system.

The present invention further includes a method for injecting digital video, comprising the steps of generating a digital image source constituted from a reference image, converting an input from the digital image source into a digital image, storing and rate converting the digital image for compatibility with an imaging system, controlling the imaging system sufficiently for target orientation, and, solving motion-rate change to the imaging system, wherein the imaging system engages in real-time simulated flight.

Additionally, the present invention includes a digital video input product provided by the process of generating a digital image source constituted from a reference image, converting an input from the digital image source into a digital image, storing and rate converting the digital image for compatibility with an imaging system, controlling the imaging system sufficiently for target orientation, and, solving motion-rate change to the imaging system, wherein the imaging system engages in real-time simulated flight.

DETAILED DESCRIPTION OF THE PREFERRED EMBODIMENT

The present invention comprises a system and method for digital video injection of real time flight simulation that allows matching of a complex scene image to weapons system optics to generate a realistic detailed response. In addition to weapons systems, the present invention is applicable to other imaging systems, such as the space shuttle, auto-pilot devices and/or other systems that direct a guided object to a specific coordinate location. Operational aspects of the present invention are disclosed in U.S. patent application Ser. No. 09/267,912 under the title "REAL TIME DETAILED SCENE CONVOLVER" of Dennis Mckinney, Bruce Heydlauff, and John Charmer, filed Mar. 5, 1999, the disclosure of which is herein incorporated by reference.

Figure 1:
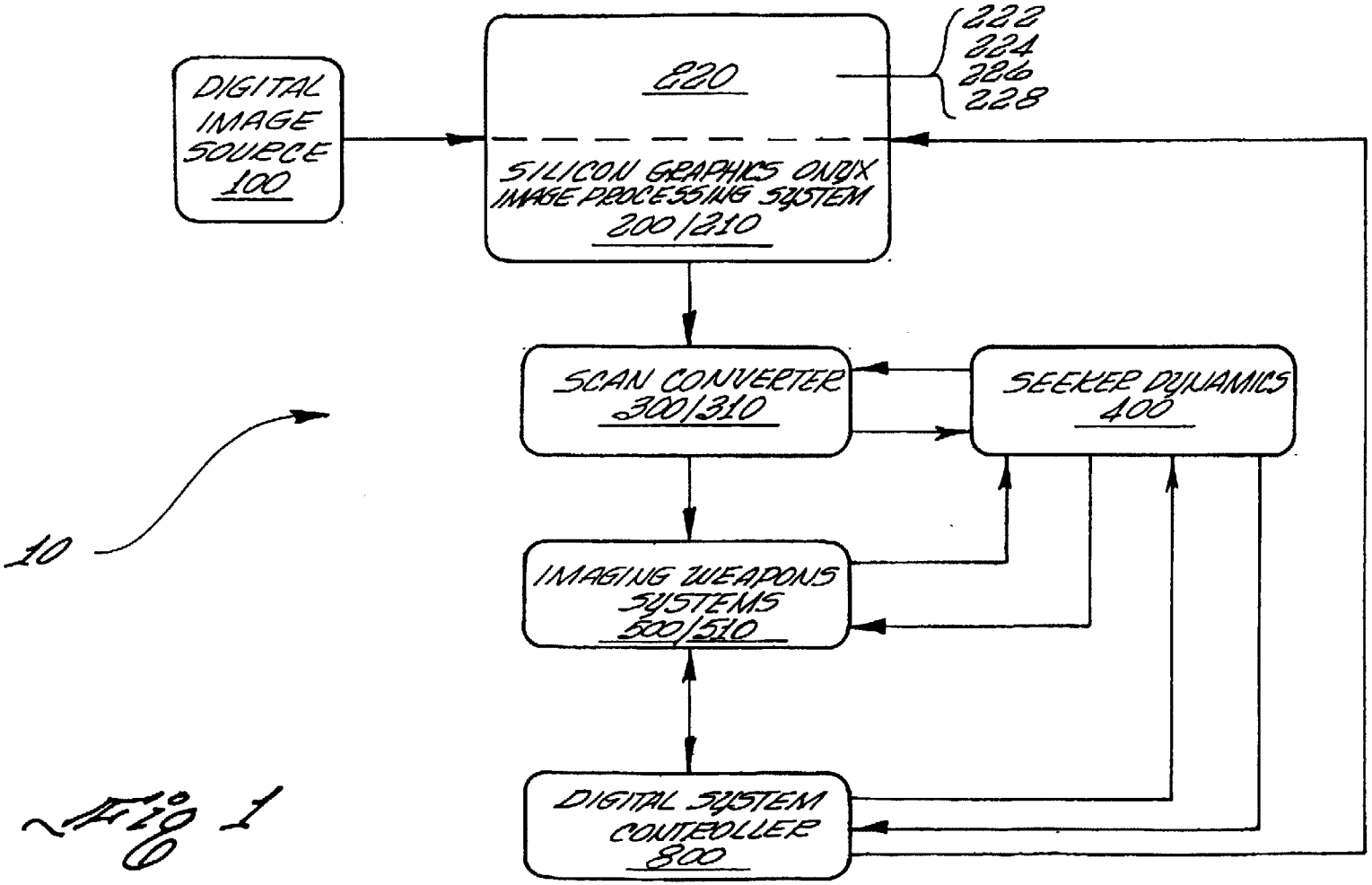
FIG. 1 is a functional block diagram of a digital video injection system of the present invention; and, FIG. 2 is an operational flowchart illustrating the digital signal injection modeling process of the present invention.

FIG. 1 shows the Digital Video Injection System (DVIS) 10 that comprises a digital image source 100, a means for image processing 200, a scan converter 300, a seeker-dynamics interface 400, and a digital system controller 600 that correlate information to an imaging system 500. The digital video injection system 10 comprises a unique application of commercially available hardware and software, as well as custom electronic interfaces, capable of providing real time, frequency rendered, geometrically corrected, formatted images to the imaging system 500.

The digital image source 100 is constituted from a reference image. Reference images are obtained from a larger "library" of images that are organized in geocoordinate order for selection. The image source 100 may be any digital image file representing the area of interest. Any image source 100 capable of rendering a representative geographical location may be used to be converted to a digital image file. Examples include photographs, real sensor data, SPOT satellite images and/or other like image sources that represent geographic locations.

The means for image processing 200 converts an input from the digital image source 100 into a geometrically correct frequency rendered digital image. The inputted digital image source 100 is converted into a visual digital image, which is then converted into a specified frequency band of a given imaging system 500 by correcting gray scales for the inputted digital image to the proper frequency spectrum. The means for image processing 200 also geometrically corrects the look angle and range of the digital image. The means for image processing 200 preferably comprises a Silicon Graphics ONYX Image Processing System 210 and associated software 220. The Silicon Graphics ONYX Digital Image Processing Computer 210 and the associated software 220 accept any image that may be converted to a digital image file. Once received by the Silicon Graphics ONYX Digital Image Processing Computer 210, the image is processed in real time to geometrically correct the image for look angle and range simulation as properly "seen" by the imaging system 500. The image is then rendered to the correct gray scales for the actual frequency spectrum of the imaging system 500, i.e., a visual frequency band photograph could be rendered to an infrared (IR), ultraviolet (UV), x-ray, or other equivalent image, with the selection of the equivalent image determinable by those skilled in the art.

Software 220 of the means for image processing 200 includes four processes: image processing 222, three-dimensional modeling 224, infrared scene model generation 226, and real-time infrared scene traversal 228. Image processing 222 comprises the first step in generating the scene to be injected. Preferably, image processing 222 uses photogrammetric workstations developed by GDE of San Diego, California under the tradename GeoSet, and Autometrics under the tradename Griffon. The workstations use mathematical models to rectify and register images collected by satellites to earth coordinates. Other capabilities of the workstations include feature and terrain extraction, modeling, and manipulation. The data generated from these workstations are exported to the three-dimensional modeling process 224.

The three-dimensional modeling 224 process produces an accurate polygonal representative of the scene. Preferably, a three dimensional modeler, developed by MultiGenParadigm of San Jose, California under the tradename MultiGen, is used. The MultiGen modeler imports data from the photogrammatric workstations to accurately position and render the significant features within the scene. Once the significant features are accurately modeled, an image analyst determines the material characteristics of the feature and assigns a material property to each polygon within the database. The three-dimensional model 224 is then exported for processing by the infrared scene generation 226 process.

The infrared scene generation 226 process converts the three-dimensional model 224 into the desired infrared spectrum. Preferably, an infrared data base modeler, developed by Technology Service Corp. of Bloomington, Indiana under the tradename IRGen, is used. IRGen contains a thermal model to compute the radiance values for each polygon within the database. A gray scale value for each vertex of each polygon is computed to represent the radiance of each polygon perceived by the seeker modeled in the sensor model. In addition, the atmospheric model computes transmittance and sky radiance which is later integrated with the visibility/haze function of the real-time scene traversal process. The model is then exported in a MultiGen data base format for processing by the real-time scene traversal 228 process.

The real-time scene traversal 228 software reads the database and the atmospheric profile computed by IRGen. The position of the seeker within the scene and the viewing angles are computed by an external simulation. The position and angles are sent through a reflective shared memory network for processing by the real-time scene traversal 228 software. The software then generates the proper scene and injects it into the seeker processor of the imaging system 500.

Once the image has been geometrically corrected and frequency rendered in the means for image processing, the image is outputted in a digital format to the scan converter 300.

The scan converter 300 accepts the digital image from the means for image processing 200. Once accepted, the scan converter 300 stores the digital image for organized retrieval, and converts the digital image for compatibility with a given imaging system 500. The digital image is stored in one of three dual-ported random access memory arrays. The scan converter retrieves the digital image at a rate required for real time operation of the imaging system 500. The scan converter 300 preferably comprises a custom designed electronic scan converter 300 that accepts the ONYX digital image, storing and rate converting the image to match the requirements of the imaging system 500. In the scan converter 300, the digital image 100 is selectively retrieved from dual ported random access memory arrays 310 in the format and at a rate required by the imaging system 500. The dual ported random access memory arrays 310 output the current scene image as the scene image for the next update is fed into the dual ported random access memory arrays 310.

The seeker-dynamics interface 400 simulates the pointing system of the imaging system 500 by providing control input and output signals to the imaging system 500. Preferably, the seeker dynamics interface 400 comprises a custom designed electronic seeker dynamics interface 400 that provides all the controls required by the imaging weapons systems 500, such as a simulated gimbal with rate controls and position feedback. This satisfies the expected control loop required by the imaging system 500.

The imaging system 500 of the present invention may be any imaging seeker 510, preferably an imaging seeker 510 for a weapons system. Imaging seekers 510 are standardized for given systems, and tested for the normal flight capabilities and performance of those systems, such as a Tomahawk missile, Harpoon missile, Space Shuttle navigational system, and/or other imaging systems 500 capable of being tested. Generally, the imaging seekers 510 comprise a sensor, a pointing system, input/output interfaces, and a signal processor. Imaging systems 500 may non-exclusively include surface-to-air, air-to-surface or air-to-air threat weapon signal processors, including a combination of tracker, counter-countermeasure and guidance circuitry, such as imaging infrared (IR), millimeter wave, laser detection and ranging (LADAR), synthetic aperture radar (SAR), and television. Sensor field of view, resolution, scan patterns, and sensitivity are modeled in real time. The target scene is injected into the seeker video processor to test the target acquisition, tracking, and man-in-the-loop characteristics of the imaging seeker in conjunction with the rest of the missile, data link, and aircraft systems.

The digital system controller 600 computes real time updates to the imaging system 500. The digital system controller 600 solves motion import in real time to the imaging system 500, i.e., real-time updated inputs or updates of motion, speed and orientation. The digital system controller 600 comprises a real time computer which solves the equations of motion and updates the imaging system 500, as well as the means for image processing 200 with current position and seeker look angle. With the update from the digital system controller 600, the means for image processing 200 may dynamically correct and render the digital image 100 for the simulated range and line of sight from the target to the imaging seeker 510. The real time digital system controller 600 is capable of solving the equations of motion and updating the imaging system 500, seeker dynamics 400, and the means for image processing 200 with the necessary controls, simulated position, and line of sight information. The digital system controller 600 preferably comprises an array of SPARC 1 E, 2E, and 10, and PowerPC VME based Single Board Computers.

Figure 2:
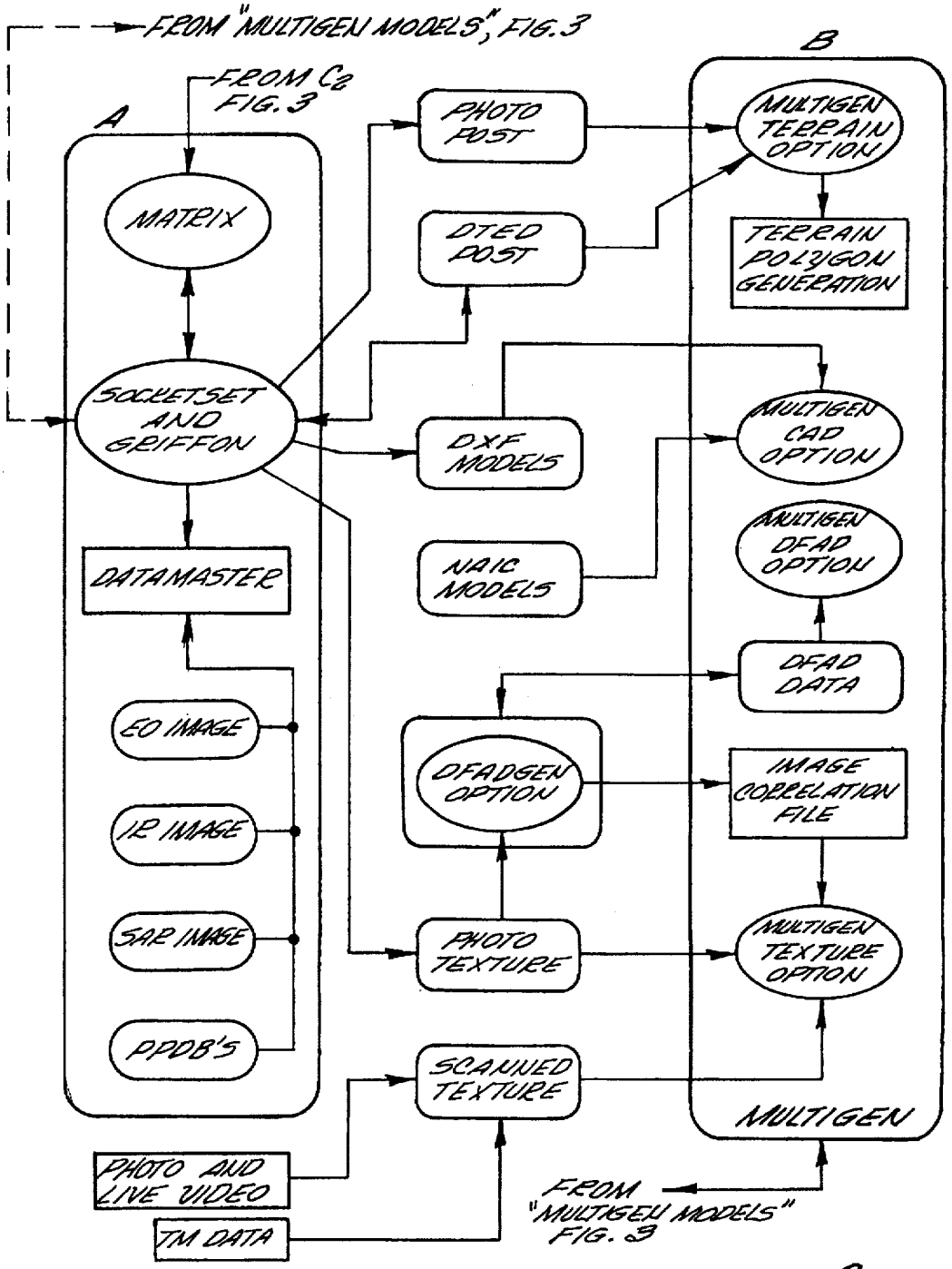
Figure 3:
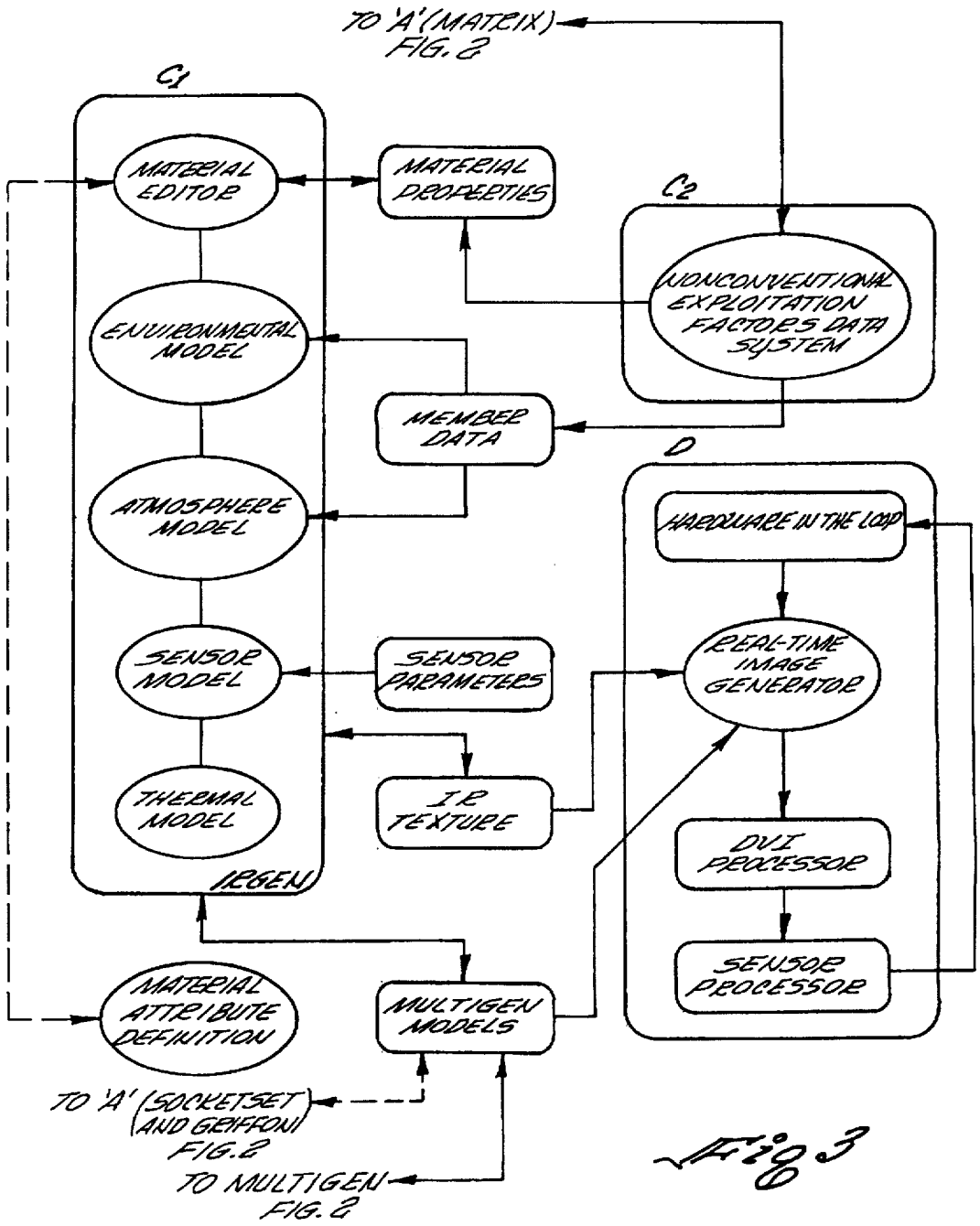
FIG. 3 is an optional flowchart illustrating the digital signal injection modeling process of the present invention.

FIG. 2 is an operational flowchart illustrating the digital signal injection modeling process of the present invention in real time. As seen in FIG. 2 blocks A, B, C1, C2 and D, the Digital Signal Injection Software approach includes four processes. First, an image processing that uses mathematical models to rectify and register the reference images to earth coordinates and to do feature/ terrain extraction. This occurs in block A via functional blocks: MATRIX, SOCKETSET AND GRIFFON, DATAMASTER, EO IMAGE, IR IMAGE, SAR IMAGE, and PPDBS. Second, in block B, MULTIGEN, three dimensional modeling produces an accurate polygonal representation of the scene where each polygon may be assigned material characteristics relative to the frequency spectrum desired. Third, in blocks Cl and C2, scene generation converts the threedimensional model of the scene to radiance values in the desired frequency spectrum by applying via functional blocks of Cl: a Thermal model, Environmental Model, Sensor Model, and an Atmospheric Model to each polygon. This occurs in the blocks IRGEN Cl, and NONCONVENTIONAL EXPLOITATION FACTORS DATA SYSTEM C2. The first three processes (thermal, environmental and sensor models) are nonreal-time events. In the fourth process, real-time scene transversal reads the database of the processed scene, and using the computed seeker position and viewing angles, generates the geometrically correct, frequency rendered scene in real-time for injection into the seeker processor.

In operation, a digital image source. constituted from a reference image is inputted into the digital video injection system 10, previously described. The digital video injection system 10 converts the digital image source into a formatted digital image, and stores that digital image. The digital video injection system 10 then rate converts the digital image for compatibility with a selected imaging system 500. Additionally, the digital video injection system 10 controls the selected imaging system 500 to provide target orientation. The digital video injection system 10 engages the selected imaging system 500 in real-time simulated flight by solving motion-rate change over an appropriate time of flight to the selected imaging system 500. This flight simulation is particularly useful for imaging systems 500 that comprise imaging weapons systems.

The actual flight simulation, or digital video input product, provides an imaging system 500, such as an imaging weapons system, realistic flight test conditions and evaluation. The flight test conditions are sequenced in real-time scenarios. The flight simulation does not expend an actual test system in live firing. The flight simulation product also is particularly advantageous in that the actual imaging system 500 of an operational device, such as a guided missile, is tested for a given target over a given set of conditions. The components and software of the present invention are designed and tested to provide a real time, virtual image to the imaging weapons system to make it "think" it is actually flying against a real target. The present invention also requires no moving parts, such as a CARCO Table to simulate motion, reducing the cost and complexity of the testing. As such, the DVIS 10 may be used to verify and test the imaging weapons system 500 in a laboratory environment at a significant reduction in cost compared to actual field or flight-testing.

The imaging system 500 is evaluated from realistic threat analysis capability which mimics real weapon free-flight behavior in highly realistic, and credible, simulation of a weapon system. Evaluations are done on criteria such as generated realistic weapon free-flight behavior through the use of real threat weapon signal processing electronics, real-time operations, full-detailed targets, countermeasures and backgrounds, dynamic behavior of all scene objects, realistic simulation of weapon end-game performance, and/ or operations in simultaneous multiple spectral bands. Flight scenarios may be varied in such aspects as heading and altitude profile, time of year, time of day, cloud cover, haze, temperature, and/or any other environmental condition, either natural or man-made. Target modeling and evaluation may be integrated with command and control networks for comprehensive mission planning and execution functions. As such the imaging system 500 is evaluated in a laboratory environment with a limitless variation of target and attack scenarios of complex flight path, target, and weather condition scenarios.

The foregoing summary, description, and drawings of the present invention are not intended to be limiting, but are only exemplary of the inventive features which are defined in the claims.

What is claimed is:

1. A digital video injection system comprising:

a digital image source constituted from a reference image;

means for image processing capable of converting an input from the digital image source into a geometrically correct frequency rendered digital image;

a scan converter capable of accepting the digital image, wherein the scan converter is capable of storing and converting the digital image for compatibility with a imaging system;

a seeker-dynamics interface capable of simulating the pointing system of the imaging system; and, a digital system controller capable of solving motion import in real time to the imaging system.

2. The system of claim 1, wherein the digital image source is an image selected from the group consisting of photograph, real sensor data and satellite image.

3. The system of claim 1, wherein the means for image processing comprises a Silicone Graphics ONYX digital image processing computer.

4. The system of claim 1, wherein the means for image processing converts the digital image source input into a visual digital image.

5. The system of claim 1, wherein the means for image processing converts the digital image source input into specified frequency bands.

6. The system of claim 1, wherein the means for image processing geometrically corrects the look angle and range of the digital image.

7. The system of claim 1, wherein the means for image processing corrects gray scales for the digital image input to a proper frequency spectrum.

8. The system of claim 1, wherein the scan converter stores the digital image for organized retrieval.

9. The system of claim 1, wherein the scan converter stores the digital image in one of three dual-ported random access memory arrays.

10. The system of claim 1, wherein the scan converter is capable of retrieving the digital image at a rate required for real time operations of the imaging weapons system.

11. The system of claim 1, wherein the digital system controller provides real-time updated inputs.

12. The system of claim 1, wherein the s eeker-dynamics interface is capable of providing control input and output signals to the imaging system.

13. The system of claim 1, wherein the seeker-dynamics interface controls input and output signals selected from the group consisting of simulated gimbal, rate control and position feedback.

14. The system of claim 1, wherein the digital system controller comprises a real-time computer.

15. The system of claim 1, wherein the digital system controller is capable of computing motion, speed and orientation updates to the imaging system.

16. The system of claim 1, further comprising an imaging system.

17. The system of claim 16, wherein the imaging system comprises an imaging weapons system.

18. A method for injecting digital video, comprising the steps of:

generating a digital image source constituted from a reference image;

converting an input from the digital image source into a digital image;

storing and rate converting the digital image for compatibility with an imaging system;

controlling the imaging system sufficiently for target orientation; and, solving motion-rate change to the imaging system, wherein the imaging system engages in real-time simulated flight.

19. The method of claim 18, wherein the imaging system comprises an imaging weapons system.

20. A digital video input product provided by the process of:

providing a digital image source constituted from a reference image;

converting an input from the digital image source into a digital image;

storing and rate converting the digital image for compatibility with an imaging system;

controlling the imaging system sufficiently for target orientation; and, solving motion-rate change to the imaging system, wherein the imaging system engages in real-time simulated flight.

21. The digital video input product of claim 20, wherein the imaging system comprises an imaging weapons system.

* * * * *